(No Model.) 4 Sheets—Sheet 1.
W. S. FORD.
TELEPHONE EXCHANGE.
No. 331,955. Patented Dec. 8, 1885.
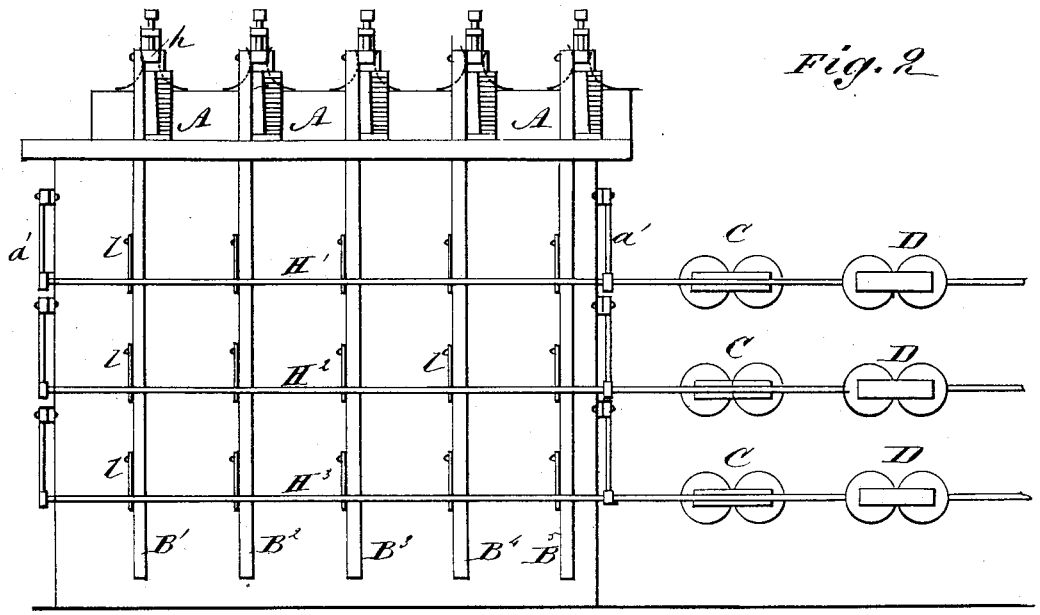
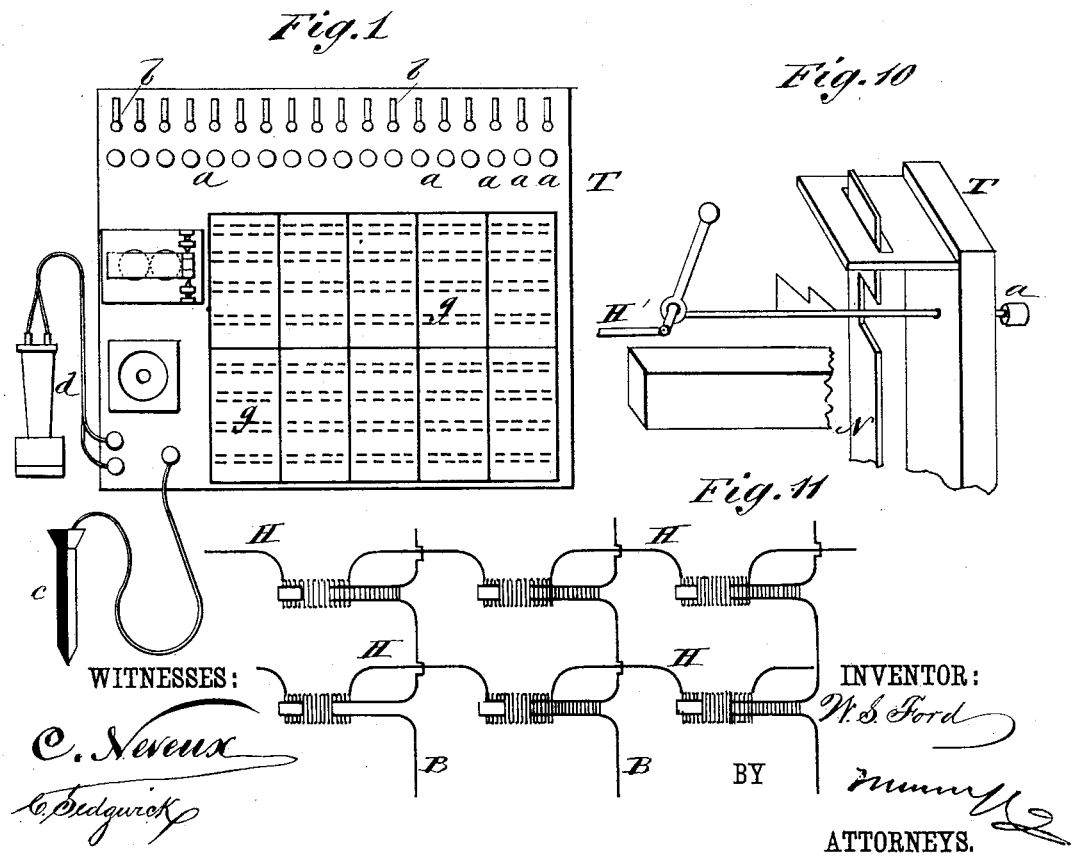
WITNESSES:
C. Neveux
C. Sedgwick
INVENTOR:
W. S. Ford
BY
ATTORNEYS.

(No Model.) 4 Sheets—Sheet 2.
W. S. FORD.
TELEPHONE EXCHANGE.
No. 331,955. Patented Dec. 8, 1885.
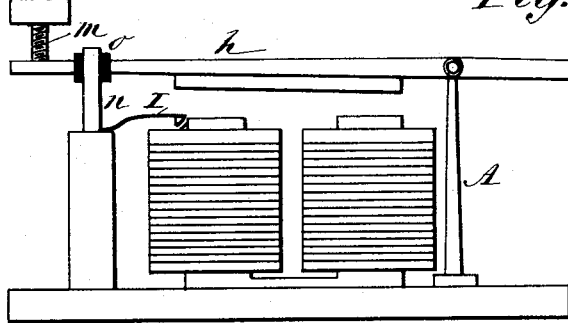
Fig. 3
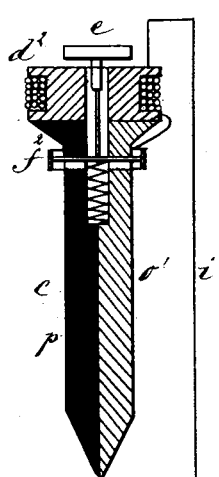
Fig. 6
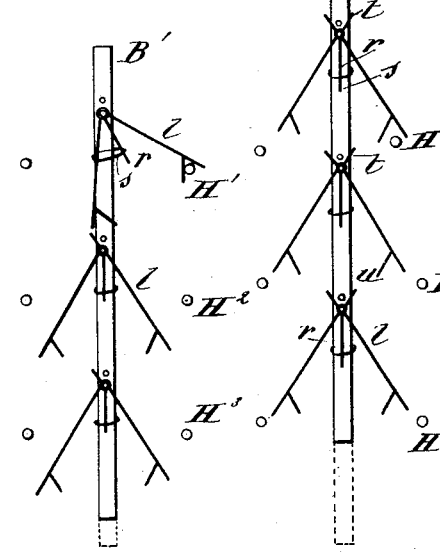
Fig. 5    Fig. 4
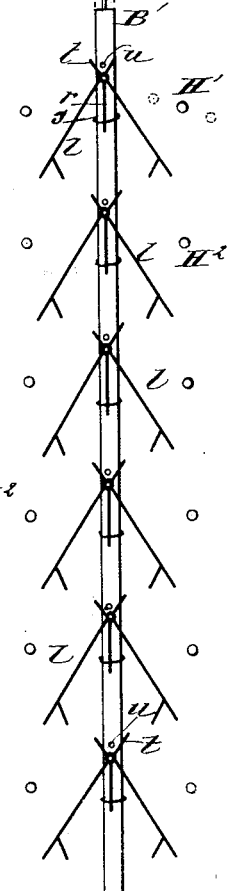
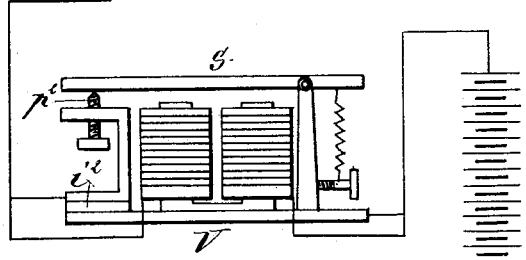
WITNESSES:
C. Neveux
C. Sedgwick
INVENTOR:
W. S. Ford
BY Munn
ATTORNEYS.

(No Model.) 4 Sheets—Sheet 3.
W. S. FORD.
TELEPHONE EXCHANGE.
No. 331,955. Patented Dec. 8, 1885.
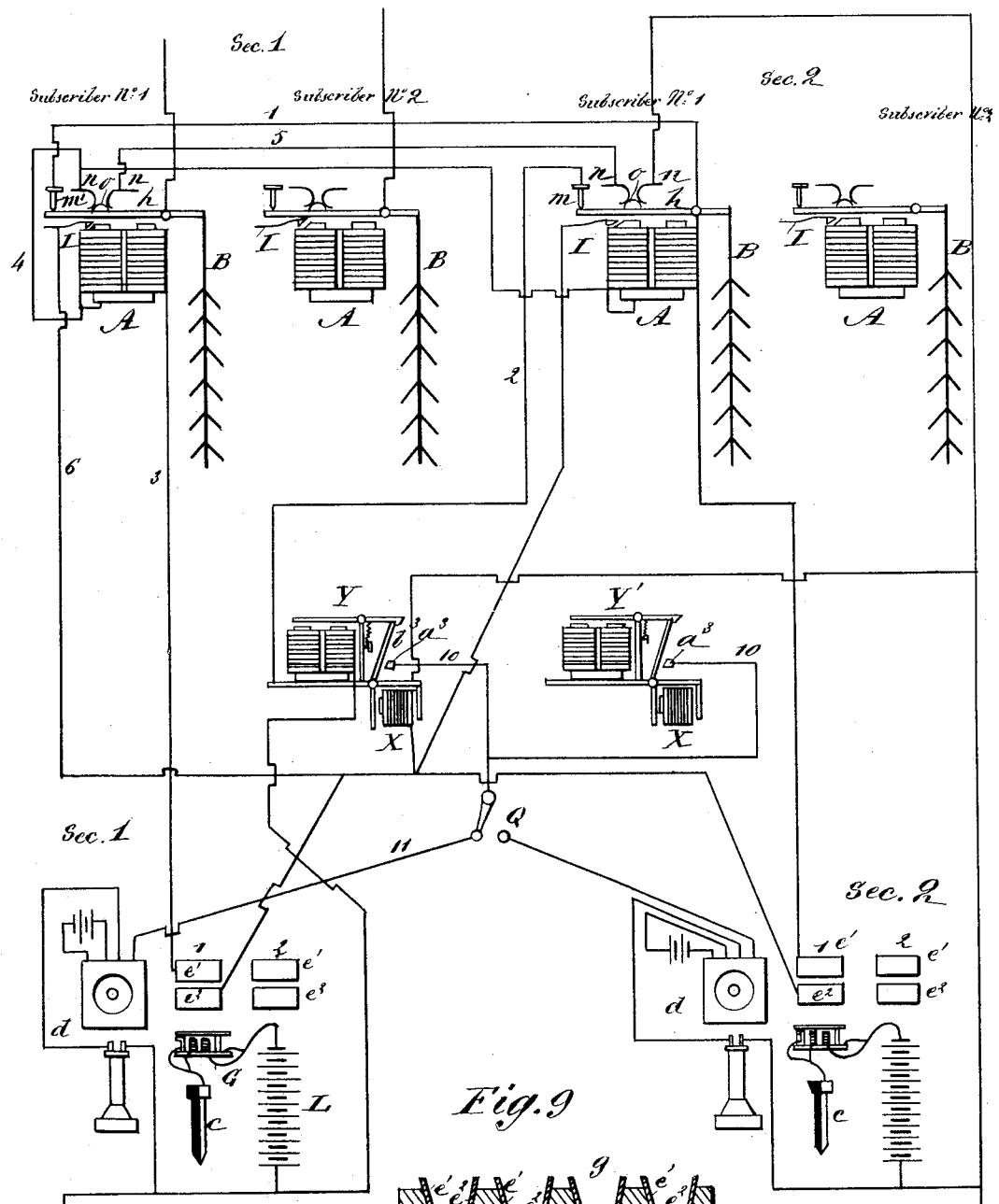

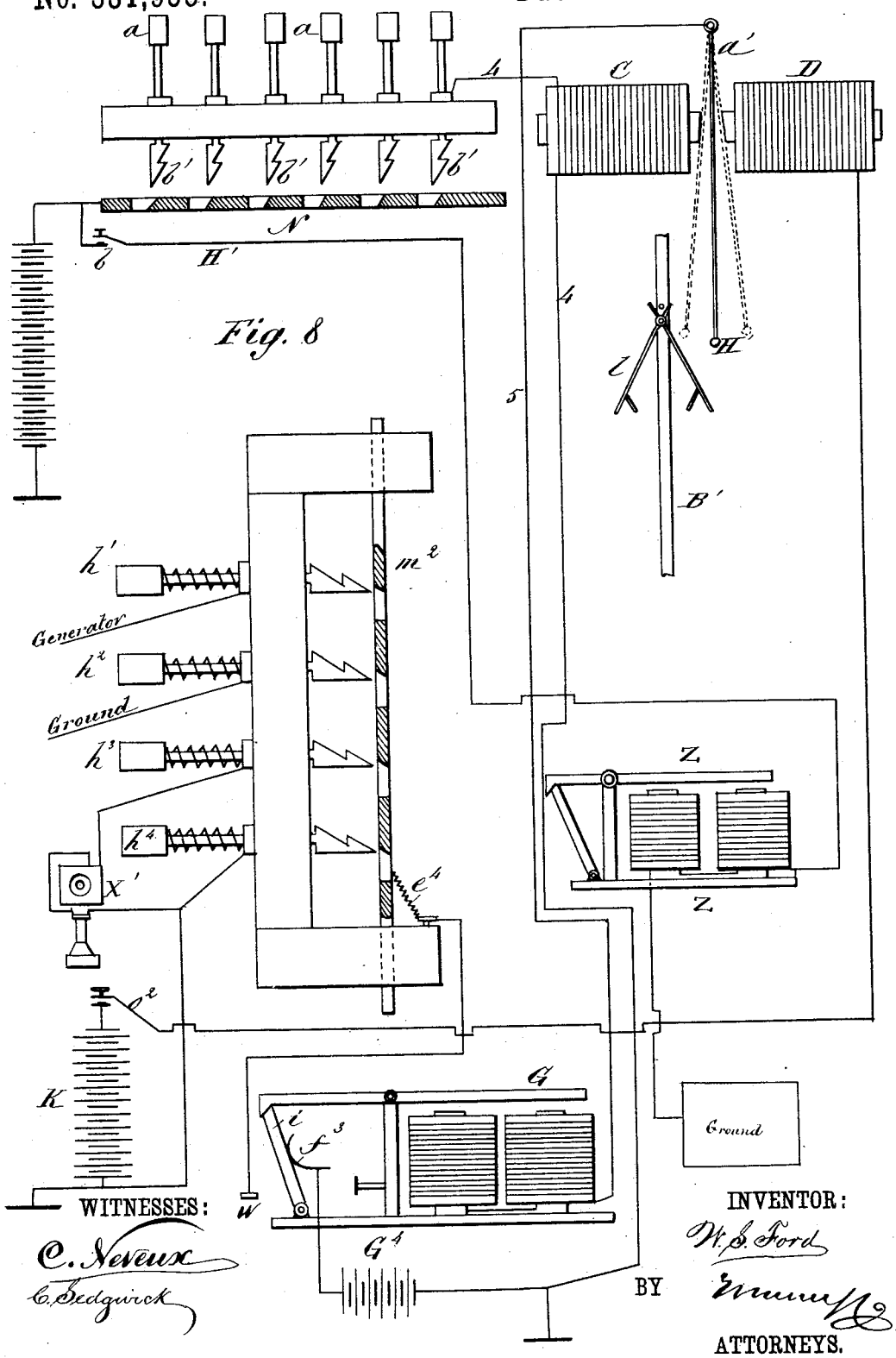

UNITED STATES PATENT OFFICE.

WILLIAM S. FORD, OF DENVER, COLORADO.

TELEPHONE-EXCHANGE.

SPECIFICATION forming part of Letters Patent No. 331,955, dated December 8, 1885.

Application filed October 24, 1884. Serial No. 146,382. (No model.)

*To all whom it may concern:*

Be it known that I, WILLIAM S. FORD, of Denver, in the county of Arapahoe and State of Colorado, have invented a new and Improved Telephone-Exchange, of which the following is a full, clear, and exact description.

This invention relates to certain new and useful apparatus and appliances employed in a telephone-exchange, and has for its object to simplify the mode of transacting the business, and to allow the performance of the work in an economical and rapid manner.

The invention consists of an apparatus for making connections on a switch-board between a line-strip and a connecting-strip by means of a current of electricity controlling or acting upon the connecting-strip, and another current operating electrical devices which control or act upon the line-strip, these currents being sent to the switch-board from an operator's table having upon it contact-points corresponding to and in connection with the electrical devices at the switch-board. I also employ mechanical and electrical devices, whereby other connections and disconnections can afterward be made upon such switch-board without interfering with connections already made.
The invention also involves the use of electrical devices operative from a disconnecting-operator's table for the purpose of replacing in their normal condition any line strip or strips which may be in connection with any of the connecting-strips.

I will first describe the mechanical construction of the whole apparatus, and then point out the electrical connections and the operation of the several parts, and of the equivalent devices which may be employed.

Reference is to be had to the accompanying drawings, forming part of this specification, in which similar letters of reference indicate corresponding parts in all the figures.

Figure 1 is a plan view of the connecting or operator's table with the parts belonging thereto. Fig. 2 is an elevation representing the switch-board with line and connecting strips according to my invention. Fig. 3 is a detail view in larger size, showing one of the line-connecting strips of the switch board and illustrating its operation. Figs. 4 and 5 are detail views illustrating the operation of the line-connecting strips. Fig. 6 is a section of the connecting-plug which is employed by the operator, showing also the magnet and battery employed therewith. Fig. 7 is a diagram showing the electrical connections as arranged in conjunction with two operating-tables corresponding switch-board and annunciators. Fig. 8 shows details of parts of the apparatus and disconnecting-tables with their electrical connections. Fig. 9 is a detail section showing the preferred construction of contact-points. Fig. 10 represents mechanical devices which may be substituted for some of the electrical devices shown. Fig. 11 is a diagram showing the arrangements of electro-magnets for effecting the connections without the use of the mechanical devices elsewhere shown.

Referring, first, to Figs. 1 and 2, the connecting or operator's table T has upon it contact-points $g$ for any desired number of subscribers, and also press-buttons $a$, belonging to the connecting-strips on the switch-board, Fig. 2. It is also provided with finger-keys $b$, one for each button $a$ and its corresponding connecting-strip; also, a telephone, $d$, and a plug, $c$, attached to a conducting-cord and connected to a heavy battery. The switch-board is provided with connecting-strips corresponding with the buttons $a$ on the table, and also line-strips for the whole number of subscribers. Only three connecting-strips, $H' H^2 H^3$, and five line-strips, $B' B^2 B^3 B^4 B^5$, are shown.

The following description of the strips H' and B' and their parts applies equally well to the others, and in referring generally to these strips I use the letters B and H without numbers. The strip B' is suspended from the end of the lever-armature $h$ of a magnet, A, upon the switch-board, as shown most clearly in the enlarged view, Fig. 3. The strip is provided with a series of pivoted catches, $l$, corresponding in number with the crossing connecting-strips H, and these catches are made double, as shown in Fig. 3, for connection with line-strips at each side. The catches are retained in their central position by means of springs $s$, connected to arms $r$, projecting from the middle portion of the catches, and they are also provided with projections $t$, which, taking against the stops $u$ on the strip, limit the swinging or side movement of the catches. The connecting-strip H' is hung by pivoted arms a', so that it may be swung to and from the strip B', and the strip is connected with the armatures of the reversely-placed magnets C D, by which the required movement is given to the connecting-strip.

The press-buttons a on the operating-table are formed at their lower ends, as shown in Fig. 8, with double inclines b', for connection with the slots of a sliding plate, N, when the keys are pressed down, and the upper incline of each tooth is longer than the lower one, so that when it is pressed in contact with the plate N it will move the plate far enough to release any button that may be already connected thereto. The plug c is preferably constructed, as shown in Fig. 6, of the metal portion o' and portion p of rubber or other insulating material. In its upper end it is fitted with a small electro-magnet, $d^2$, connected to the metal o', and by a cord, i, with the magnet V and the ground. The armature S of the magnet V is hung to vibrate, and arranged to short-circuit the coils when in contact with the point $p^2$, which is on a support insulated at $i^2$. The ordinary operations of these parts are that the armature S will vibrate whenever the plug c is brought in contact with any of the points g, and at the same time the armature e of the magnet $d^2$ will be drawn down and move the ring $f^2$, that is connected to the armature, indicating to the operator in two ways—one of sound and one of touch—whether the line is already in use, because if the line is in use the magnets and the plug are cut out of circuit by devices hereinafter described. This form of plug c, made one-half of insulating material, is adapted especially for use with the contact-points g, constructed as shown in Fig. 9, which are formed of two plates, $e'$ $e^2$, set in mortises in the table and separated by insulating material. The plate $e'$ connects to the magnet A, while the plate $e^2$ connects to the annunciator belonging to that subscriber, and this construction gives to the operator means for putting up any annunciator without causing action of the line-connecting strip at the switch-board, which can be done by simply touching the plate $e^2$ with the metal portion of the plug. In making connection the plug will of course be turned so as to make contact of one plate, $e'$, with the metal of the plug.

The parts belonging to the disconnecting or clearing-out table are shown in Fig. 8. These consist of a series of press-buttons, $h'$ $h^2$ $h^3$ $h^4$, for each connecting-strip similar to those used with the operating-table, and fitted in a suitable frame for movement in connection with a slide-bar, $m^2$, which has the electrical connections hereinafter described; also, a telephone, $x'$, which is in circuit with the plug $h^3$ and an annunciator, Z.

The operation for connecting any two subscribers is as follows: Upon a call being indicated by the annunciator the operator, after getting the number of the caller by means of the telephone d, presses down one of the buttons a, and, taking up the plug c, touches the contact-points of the calling and called subscriber's long enough to make good electrical connection, and then drops the plug again. For instance, supposing No. 1 is to be connected with No. 3 on the connecting-strip H', the button a belonging to the strip H' is pressed down, thus sending battery to magnets C belonging to this strip H' with the effect to pull the strip toward the switch-board, and the button remaining down in contact with the slide-bar N. The strip H' is thus held until some other button a is pressed down, in which event bar H' will drop back into its ordinary position although any line-strips B which have been previously connected with it remain connected. The contact-point g numbered 1 is then touched with the plug C, thereby sending battery to magnet A and raising the line-strip B', so that the catch l upon the strip B' slides past the strip H'. The contact-point g numbered 3 is then touched with the plug, thereby causing the strip $B^3$ to be raised in the same manner, and as soon as the plugs are removed, the connection with magnets A being broken, the strips B fall back, leaving the catches l in connection with the line-strip H', and thus connecting two subscribers. These three positions of the strip B' are shown in Figs. 3, 4, and 5.

In Fig. 4 the strip B' is raised and the line-strip H' is moved inward, and in Fig. 5 the strip B' is moved downward, the latch l passing upon the line-strip H', as shown.

The disconnecting-operator, sitting at his table, by pressing in the button $h^3$, Fig. 8, puts his telephone in circuit, and by "listening in" discovers when the subscribers have finished talking, and then by pressing the key $o^2$ sends battery to magnet D belonging to the strip H', pulls that strip away from the switch-board, and disconnects it from the catches upon the strips B' and $B^3$, causing them to fall back and break the connection. This is the general operation. The auxiliary devices operate as next described.

It is to be noticed that in the position of the strip B' it is slightly raised when connected with strip H, as indicated by the dotted lines in Fig. 5 at its lower end, so that connection is broken between the armature h and the springs n at the magnet A, which are normally connected by an insulated collar, o, on the armature-rod. The magnet A has a small armature on the end of a spring, I, which is attracted when the circuit is broken, as just described, and by suitable connections causes the return to place of the shutter of the annunciator. In this position of the strips B' and H' the connection between any other strips B and H can be made without interfering with the connection already established, because the bars B, although slightly raised, are not so high but that any other connecting-strip H can be moved toward any strip B without touching the bars B already in use.

When a connection has been made, as above described, and one of the subscribers is again called for, the operator presses upon the key b belonging to that strip, which will throw an annunciator on the disconnecting-operator's table, and thereby inform the latter operator of the fact that the party called for on that strip is busy, and the disconnecting-operator will then notify the caller of that fact.

In Fig. 7 is shown the line and the local connecting-circuits in an exchange of two subscribers having two connecting-tables and two switch-boards. With a greater number of subscribers more connecting-tables and a corresponding number of switch-boards would be used, but the circuits would be arranged the same as on the table and switch-board marked "Section 2." The last switch-board will be the one where all the local connecting-circuits would go to ground, and where all the line circuits would go to the annunciator. (Represented at Y in this figure.)

As here shown, the annunciator-strips $a^3$ are both thrown by means of wires 10 and switch Q to the operator's instrument at section 1. By turning the switch they would go to section 2, or with a large number of subscribers they would be divided among several tables by similar switches. Upon the subscriber making the call the current traverses his line to the armature-bar h, (switch-board section No. 1,) contact-screw $m'$, wire 1, armature-bar h, (switch-board section No. 2,) contact-screw m, wire 2, to the coils of the annunciator y and to ground, thus causing the shutter to fall against the strip $a^3$, and establishing a branch from the wire 2 through the metal frame of the annunciator-shutter $b^3$, strip $a^3$, wire 10, switch q, and wire 11 to the operator's instrument. The operator then touching the contact-point, as before described, the current from the battery L is caused to traverse the wire 3, the magnet A, the wire 4, the springs n, by collar o to wire 5, springs n, and collar o to ground. The moment the current passes through the magnet A the armature h is attracted, raising its connected strip B, as before described, and at the same moment the small armature on the end of the spring I is attracted to the core of the magnet. The circuit then is by wire 3, cores of the magnets A, the spring I, wire 6, and the small magnet x of the annunciator to ground, and the magnet x acts to move the shutter back to its place. When the plug c is removed to cut off the battery, the spring I leaves the core of the magnet A, and the contact-point g, belonging to the strip B of every connecting-table, will then "test open," because the local connecting circuit for that number is open at the springs n on the switch-board belonging to section 1. If the operator of section 2 had made the connection, the local connecting-circuit would have been opened at the springs n of the other armature-h. The line No. 1 is also disconnected from the annunciator Y on account of the circuit being opened at the contact-screw m.

Fig. 8 illustrates the operation and arrangement of the circuits in relation to one of the connecting-strips H', and its governing-magnet, the press-buttons a, and one of the "busy" keys b belonging to the connecting-table, and also the devices at the disconnecting-operator's table. When one of the buttons a is pressed down and engages the slide-bar N, as described above, the battery is placed into connection with magnet C, battery-wire 4, and to ground, thus causing the strip H' to move from its intermediate position toward the table. When the second plug or button a is pressed down, the first one is disengaged from the slide N, and the strip H' goes back to its middle position, but is still engaged with the catches upon the connecting-strip B'. From the supporting-arm of the strip H' a wire, 5, passes to the coils of the annunciator G, through the shutter and spring $f^3$ to battery and ground. When a subscriber is connected on the strip H', the current from the battery $G^4$ causes the shutter to fall, thereby causing the current from wire 5 to go to the bar W, spring $e^4$ on the clearing-out table, slide-bar $m^2$, and thence to ground through whichever one of the plugs $h^2$ $h^3$ $h^4$ that may be engaged with the bar $m^2$. Before and a few seconds after the connection has been put upon the strip H' the plug $h'$ is left connected with the bar $m^2$, which causes the current to go from the generator or pole-charger to the strip H' and the subscriber's station, thereby giving the call. The disconnecting-operator then pushes the button $h^2$, which, engaging with slide-bar $m^2$, releases the button $h'$. The disconnecting-operator then, by pushing in the button $h^3$, is enabled to determine, by listening in, the proper time for disconnecting the line, which is done by pressing in the button $h^4$, and at the same time pressing the finger-key $o^2$, thereby causing the battery K to send a current to the magnets D, by which the strip H' is drawn away and released from the catch upon the connecting bar or strip B'. As soon as the key $o^2$ is released, the strip H' will return to its normal position, and the operator raises the shutter of the annunciator Z, which, if it will stay up, indicates that the disconnection has been made all right. The plug $h^4$ and ground-connection shown therewith are not strictly essential, because the button $h^3$ may be left in while the key $o^2$ is being used to make the disconnection.

It will be readily understood that there are many mechanical and electrical devices which may be substituted for those shown, and also that in place of using the mechanical devices the operation may be accomplished by electricity, or vice versa.

I have shown in Fig. 10 a mechanical device for giving the required motion to the line-strip H, which consists in simply connecting the button $a$ to the said line strip and using the slide-bar N, simply to retain one button in place until released by the movement of the other.

In Fig. 11 an arrangement is shown for making connection between the strips H and any one of the strips B, which consists simply in a series of axial magnets the cores of which are in connection with the connecting-strips H, and their armatures are connected to the line-strips B, so that upon a current being passed through any one of the strips B and any one of the strips H the movement of the armatures at the crossing of the two currents will cause the strips H B to come in contact. Any suitable device may also be substituted for the catches $l$ on the strips B. For instance, the catches may be formed without forked ends, so as to simply slide upon the line-strips.

The apparatus herein shown and described forms no part of the present invention; but I reserve to myself the right to make a separate application therefor at some future time.

I do not limit myself in respect to any of these details of construction, as they all have for their object the connection of two crossing previously-disconnected conductors by the combined mechanical or electrical action produced at their crossing by moving or exciting, mechanically or electrically, the said conductors.

Having thus described my invention, what I claim as new, and desire to secure by Letters Patent, is—

1. A telephone-exchange which consists in the combination and arrangement, substantially as described, of a switch-board provided with crossing, connecting, and line strips, a series of electro-magnets arranged to give movement to the strips, an operating-table provided with separate contact-points for the line-strips, and also for the connecting-strips, a plug or stylus connected with a battery, and a disconnecting-table provided with keys or buttons and having separate connections with the magnets of the connecting-strips, all for operation as specified.

2. The combination, in a telephone-exchange, of a series of line and connecting strips crossing each other and fitted for movement to and from each other, and electro-magnets for moving said strips, that are controlled by electrical connections on an operator's table, substantially as described.

3. The combination, in a telephone-exchange, of a series of line-strips, B, connecting-strips H, crossing the line-strips, catches $l$ on the line-strips, electro-magnets A C D, for moving said strips, and circuit-connections, substantially as shown and described.

4. The combination, in a telephone-exchange, of a switch-board provided with the movable strips H B with their operative magnets A C D, and the operating-table T, provided with the contact-points $g$, press-buttons $a$, and the plug $c$, having battery-connections, substantially as shown and described.

5. The combination, with a telephone-exchange, of a switch-board provided with movable conducting-strips, an operator's table provided with contact-points, and press-buttons corresponding to the conductors, and a disconnecting or clearing table having circuit-connections to the table T and the switch-board, all substantially as described.

6. In a telephone-exchange, the combination, with the switch-board provided with the line-strips B, of the hinged connecting-strips H, the magnets C D, and circuit-connections, substantially as described.

7. The combination, with the operator's table T, provided with contact-points $g$ and press-buttons $a$, of the slide-bar N and circuit-connections from the slide-bar to the switch-board, substantially as described.

8. The combination, with the operating-table T, provided with contact-points $g$, of the plug $c$, signal-magnet V, the magnet $d^2$, forming a part of said plug, and battery-connections, substantially as described.

9. The combination, with the line-strips B and their controlling-magnets A, of the spring-armature I, for the magnet A, the springs $n$, connected by an insulated collar on the armature-rod, and circuit-connections, substantially as and for the purpose specified.

10. In a telephone-exchange, the combination of movable line-strips B, provided with pivoted catches, conducting-strips H, hung for movement to and from the line strips, and devices for moving the strips to effect metallic contact, substantially as described.

WILLIAM S. FORD.

Witnesses:
ALLEN W. GUILD,
WM. F. SCHEFFEL.